United States Patent
Shao et al.

(10) Patent No.: US 8,212,722 B2
(45) Date of Patent: Jul. 3, 2012

(54) SYSTEM AND METHOD FOR DISCOVERING AND TRACKING COMMUNICATION DIRECTIONS WITH ASYMMETRIC ANTENNA SYSTEMS

(75) Inventors: Huai-Rong Shao, Santa Clara, CA (US); Su Khiong Yong, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 399 days.

(21) Appl. No.: 12/409,385

(22) Filed: Mar. 23, 2009

(65) Prior Publication Data
US 2009/0273520 A1    Nov. 5, 2009

Related U.S. Application Data

(60) Provisional application No. 61/049,365, filed on Apr. 30, 2008.

(51) Int. Cl.
*H04B 7/00* (2006.01)
(52) U.S. Cl. ...................................... 342/367
(58) Field of Classification Search ................. 455/41.2, 455/63.4, 3.05, 131, 269, 272, 273; 342/385, 342/417, 367–372; 370/310, 328, 336, 338, 370/437, 442, 461, 462, 913; *H04B 7/00, H04B 7/204; H04L 12/43; H04J 3/02; G01S 1/00, G01S 1/08*
See application file for complete search history.

(56) References Cited

U.S. PATENT DOCUMENTS

| | | | | |
|---|---|---|---|---|
| 6,393,303 B1 * | 5/2002 | Katz | ............................ | 455/562.1 |
| 7,002,938 B2 * | 2/2006 | Hester et al. | .................. | 370/330 |
| 7,280,801 B2 * | 10/2007 | Dahl | ............................ | 455/41.2 |
| 7,289,828 B2 | 10/2007 | Cha et al. | | |
| 2003/0128684 A1 * | 7/2003 | Hirsch et al. | .................. | 370/338 |
| 2005/0059420 A1 * | 3/2005 | Salokannel et al. | .......... | 455/522 |
| 2005/0063340 A1 * | 3/2005 | Hoffmann et al. | ............ | 370/332 |
| 2005/0159106 A1 * | 7/2005 | Palin et al. | .................... | 455/41.2 |
| 2006/0073850 A1 | 4/2006 | Cha et al. | | |
| 2006/0203789 A1 * | 9/2006 | Iacono et al. | ................. | 370/338 |

(Continued)

OTHER PUBLICATIONS

IEEE Computer Society, "IEEE P802.15.3c/DF2 Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension", IEEE, Mar. 2008, pp. i-136, United States.

(Continued)

*Primary Examiner* — Harry Liu
(74) *Attorney, Agent, or Firm* — Kenneth L. Sherman, Esq.; Michael Zarrabian, Esq.; Sherman & Zarrabian LLP

(57) ABSTRACT

A system and method for discovering and tracking communication directions is disclosed herein. In one embodiment, communication directions for two devices with asymmetric antenna systems are discovered. In one embodiment, a contention access period (CAP) is partitioned into an association CAP and a regular CAP, either of which may be further partitioned into sub-CAPs corresponding to different reception directions. In one embodiment, an association request command is transmitted by a device at different association sub-CAPs to train a transmission direction of the device. In one embodiment, further training is performed to find the best communication directions, as collisions may occur when association request commands are transmitted at different association sub-CAPs.

42 Claims, 9 Drawing Sheets

U.S. PATENT DOCUMENTS

| | | | |
|---|---|---|---|
| 2007/0002734 A1* | 1/2007 | Kim et al. | 370/229 |
| 2007/0054617 A1* | 3/2007 | Nikolajevic et al. | 455/41.2 |
| 2007/0153817 A1* | 7/2007 | Osann | 370/406 |
| 2008/0002627 A1 | 1/2008 | Cha et al. | |
| 2008/0112370 A1* | 5/2008 | Kwon | 370/336 |
| 2009/0054054 A1 | 2/2009 | Shao et al. | |
| 2009/0109938 A1* | 4/2009 | Singh et al. | 370/337 |
| 2009/0160707 A1* | 6/2009 | Lakkis | 342/367 |
| 2009/0189812 A1 | 7/2009 | Xia et al. | |

OTHER PUBLICATIONS

International Search Report and Written Opinion dated Nov. 23, 2009 for International Application No. PCT/KR2009/001838 from Korean Intellectual Property Office, pp. 1-11, Seo-gu, Daejeon, Republic of Korea.

* cited by examiner

SYSTEM AND METHOD FOR DISCOVERING AND TRACKING COMMUNICATION DIRECTIONS WITH ASYMMETRIC ANTENNA SYSTEMS

CROSS-REFERENCE TO RELATED APPLICATIONS

This application claims the benefit under 35 U.S.C. §119(e) of U.S. Provisional Application No. 61/049,365, filed on Apr. 30, 2008, the disclosure of which is incorporated herein by reference in its entirety.

BACKGROUND

1. Field

The present invention relates to wireless communications and, more particularly, relates to discovery and association in a wireless network that includes devices with asymmetric antenna systems.

2. Description of the Related Technology

A wireless communication network is commonly associated with a telecommunications network where the interconnections among the devices of the network are implemented without the use of wires. Such networks are generally implemented with some type of remote information transmission system that uses electromagnetic waves, such as radio waves, for the carrier.

A wireless personal area network (WPAN) is one type of wireless network used for communication among a plurality of devices, such as computers, mobile phones, personal digital assistants, printers, digital cameras, televisions, media players, etc. Usually, a WPAN covers a short range of up to 10 or 20 meters. A number of standards for such short-range network communications have recently been developed, including Bluetooth and IEEE 802.15, for example.

Some embodiments of a WPAN operate at high frequencies, e.g. about 60 GHz, at which free space path loss is higher than at lower frequencies due to the fact that free space path loss increases quadratically with frequency. To compensate for such high attenuation, some network devices are configured to transmit directionally, in which the received signal is stronger at particular locations as compared to other locations. To achieve this, some network devices employ sector antennas which physically direct the radiation pattern of the antenna in a particular direction. Other methods of direction transmission include beamforming, in which many antennas transmit weighted versions of the same signal resulting in some locations in which the many transmissions are in-phase and add together to result in strong reception and other locations in which the many transmissions are out-of-phase and result in weaker reception.

Some network devices employing directional transmission also employ directional reception. In some embodiments, the same antennas are used for reception and transmission, resulting in a symmetric antenna system (SAS), in which the transmission directions and reception directions are the same. In other embodiments, different antennas are used for reception and transmission, resulting in an asymmetric antenna system (AAS), in which the transmission directions and reception directions are different. A device with only one set of antennas used for both reception and transmission can still include an asymmetric antenna system (AAS) if the transmission directions and reception directions are different.

SUMMARY OF CERTAIN INVENTIVE ASPECTS

One aspect of the invention is a method of data communication in a wireless network, the method comprising transmitting, during a first time interval, one or more first beacons in a set of transmission directions, and transmitting, during a second time interval, one or more second beacons in the set of transmission directions.

Another aspect of the invention is a method of wireless communication in a wireless network, the method comprising receiving, in a first reception direction, a first beacon transmitted in a particular transmission direction, receiving, in a second reception direction, a second beacon transmitted in the particular transmission direction, determining, for the received beacons, an indication of link quality, and selecting the first or second reception direction based on the indications of link quality.

Another aspect of the invention is a method of associating a first device and a second device in a wireless communication network, the method comprising transmitting a data packet indicative of a partitioning of a contention access period into an association contention access period and a regular contention access period, and receiving an association request during the association contention access period.

The data packet can also indicate that either or both of the association contention access period or the regular contention access period is further partitioned into sub-CAPs associated with different directions.

Another aspect of the invention is a method of associating a first device and a second device in a wireless communication network, the method comprising receiving a data packet indicative of a partitioning of a contention access period into an association contention access period and a regular contention access period, and transmitting an association request during the association contention access period.

Another aspect of the invention is a method of selecting directions for a first device and a second device in a wireless communication network, the method comprising receiving, in a set of reception directions of the second device, one or more beacons, each beacon associated with a transmission direction of the first device, determining, based on the received beacons, indications of link quality, selecting, based on the indications of link quality, a particular transmission direction of the first device, selecting, based on the indications of link quality, a particular reception direction of the second device from the set of reception directions of the second device, and transmitting, in a plurality of transmission directions of the second device, data indicative of the selected transmission direction of the first device.

Still another aspect of the invention is a system for selecting directions for a first device and a second device in a wireless communication network, the system comprising a receiver configured to receive, in a set of reception directions of the second device, one or more beacons, each beacon associated with a transmission direction of the first device, a selector configured to select a particular transmission direction of the first device and a particular reception direction of the second device based on measures of link quality associated with the beacons, and a transmitter configured to transmit, in a plurality of transmission directions of the second device, data indicative of the selected transmission direction of the first device.

Still another aspect of the invention is a method of selecting directions for a first device and a second device in a wireless communication network, the method comprising transmitting one or more beacons in a set of transmission directions of the first device, receiving, in a reception direction of the first device, data indicative of a selected transmission direction of the first device and a transmission direction of the second device, and transmitting, in the selected transmission direction of the first device, data indicative of the transmission direction of the second device.

Yet another aspect of the invention is a system for selecting directions for a first device and a second device in a wireless communication network, the system comprising a transmitter configured to transmit one or more beacons in a set of transmission directions of the first device, and a receiver configured to receive, in a reception direction of the first device, data indicative of a selected transmission direction of the first device and a transmission direction of the second device, wherein the transmitter is further configured to transmit, in the selected transmission direction of the first device, data indicative of the transmission direction of the second device.

DETAILED DESCRIPTION OF CERTAIN INVENTIVE EMBODIMENTS

The following text describes certain exemplary embodiments of the invention. However, the invention can be embodied in a multitude of different ways as defined and covered by the claims. In this description, reference is made to the drawings wherein like parts are designated with like numerals throughout.

WPAN System Overview

A wireless personal area network (WPAN) system is a computer network used in communication between devices (for example, portable computers, telephones, or personal digital assistants). The range of a WPAN is typically a few meters, but may be more under certain circumstances. A WPAN may be used to communicate between the devices, or to interconnect with a higher level network such as the Internet. A number of standards for network communications have recently been developed, including Bluetooth and IEEE 802.15, for example.

Figure 1:
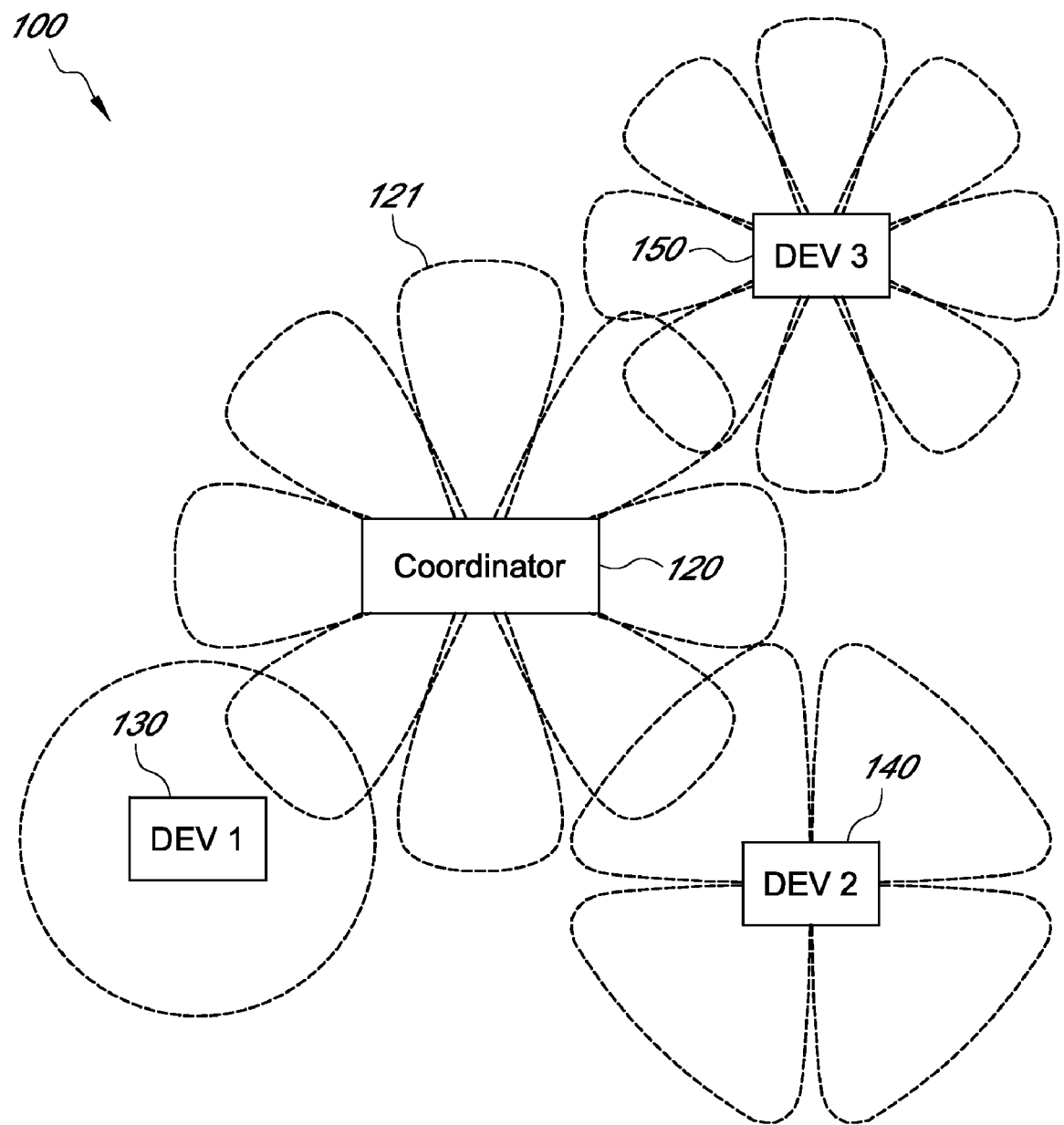
FIG. 1 is a diagram of an exemplary wireless personal area network of wireless devices.

FIG. 1 is a diagram of an exemplary wireless personal area network. The illustrated network 100 includes a coordinator 120, a first device 130, a second device 140, and a third device 150. Other WPAN embodiments may employ ad hoc networking schemes and, thus, lack a designated coordinator. Communication between the various devices in the network may be performed using a variety of different parameters, including different modulation and coding schemes, different protocols, different random access schemes, and different frequency bands.

In some embodiments, the coordinator 120 is responsible for coordinating data transfer between itself and other devices, or between the other devices of the network. The coordinator 120 generally partitions a wireless channel into a number of time periods and schedule communication between specific devices during those time periods. The coordinator may be, for example, a television, a set-top box, a personal computer, a laptop computer, or a dedicated controlling box.

In the network 100 of FIG. 1, the coordinator 120 is configured to perform directional transmission and reception with the devices 130, 140, 150. The coordinator 120 may utilize sector antennas for the directional transmission and/or reception. Each sector 121 represents a different direction along an axis away from the coordinator 120 which can be used for transmission or reception of data. The coordinator 120 selects a sector and, while the sector is selected, is able to transmit and/or receive data in a general direction defined by the shape of the sector.

The first device 130 may utilize omni-directional transmission and reception. The second device 140 may utilize a sectored antenna with more or fewer sectors than the coordinator 120. In addition, the third device 150 may utilize a sector antenna with the same number of sectors as the coordinator 120. Each of the devices 130, 140, 150 can be, for example, a television, a desktop computer, a laptop computer, a set-top box, a DVD player or recorder, a VCR, an audio player, a digital camera, a camcorder, a game device, or a computer peripheral such as a mouse, a keyboard, a printer, a scanner, or the like.

Directional transmission may also be accomplished through the use of beamforming by either the coordinator 120 or one or more of the devices. In some embodiments, an asymmetric antenna system (AAS) may be employed by either the coordinator or one or more of the devices, resulting in different sets of transmission and reception directions.

In general, a device may wirelessly communicate by radiating electromagnetic radiation via one or more antennas connected to a transceiver. A transceiver can comprise a transmitter, a receiver, or both a transmitter and a receiver. A device may comprise a processor provided to a memory. The processor can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in any suitable computer readable medium, such as the memory. The memory can be a volatile or non volatile memory such as a DRAM memory, flash memory, ROM memory, EPROM memory, EEPROM memory, registers, hard disk, a removable disk, a CD-ROM, or any other form of suitable storage medium known in the art. An exemplary storage medium is coupled to the processor such the processor can read information from, and write information to, the storage medium. In the alternative, the storage medium may be integral to the processor. The processor and the storage medium may reside in an ASIC or in any suitable commercially available chipset.

Figure 2:
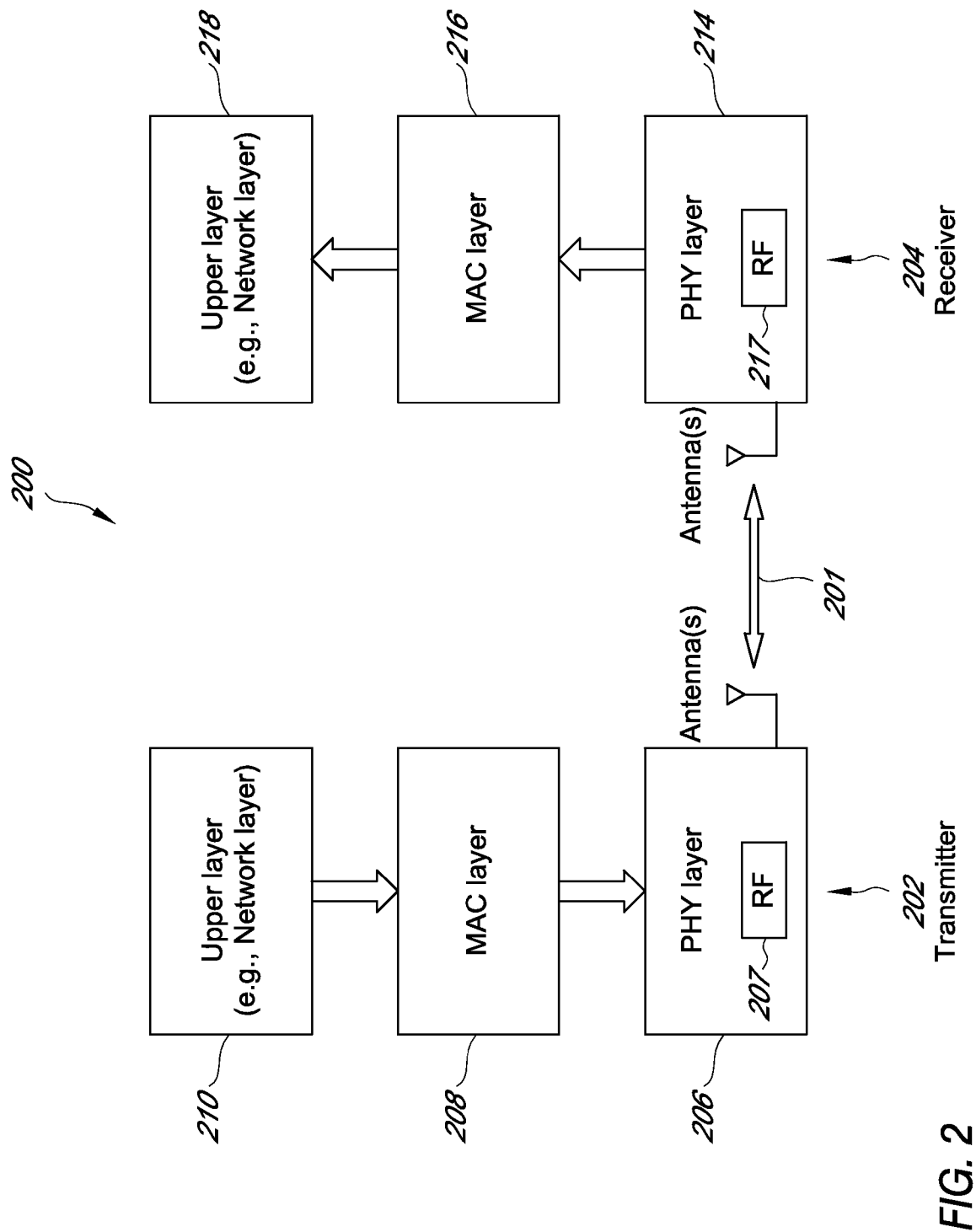
FIG. 2 is a functional block diagram illustrating an exemplary communication system for transmission of data over a wireless medium, according to one embodiment.

FIG. 2 shows a generalized block diagram illustrating an exemplary wireless personal area network (WPAN) system 200. The example WPAN system 200 includes a wireless transmitter 202 and wireless receiver 204. The transmitter 202 includes a physical (PHY) layer 206, a media access control (MAC) layer 208, an upper layer 210, and one or more antennas. Similarly, the receiver 204 includes a PHY layer 214, a MAC layer 216, an upper layer 218, and one or more antennas. In some embodiments, the PHY layers 206, 214 include radio frequency (RF) modules 207, 217. The PHY layers 206, 214 provide wireless communication between the transmitter 202 and the receiver 204 via the RF modules 207, 217 and the one or more antennas through a wireless medium 201.

The upper layers 210, 218 represent one or more layers that are above the MAC layers 208, 216, respectively, and send command and/or data messages to the MAC layers. In certain embodiments (e.g., OSI or TCP/IP models), the upper layer 210, 218 includes a network layer. In certain embodiments, the network layer includes an IP protocol that performs the basic task of getting data packets from source to destination. In other embodiments (e.g., five-layer TCP/IP model), the upper layer 210, 218 further includes a transport layer and an application layer. In other embodiments, (e.g., seven-layer OSI model), the upper layer 210, 218, in addition to the transport layer and the application layer, further includes a session layer and a presentation layer. OSI and TCP/IP are well known data networking models and will not be further described here.

In the wireless transmitter 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the wireless receiver 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 210 where the messages are further processed and/or transferred to other modules or devices to be displayed (text or graphics) or played (audio), for example.

Wireless Network Employing Beacon Signals

Figure 3:
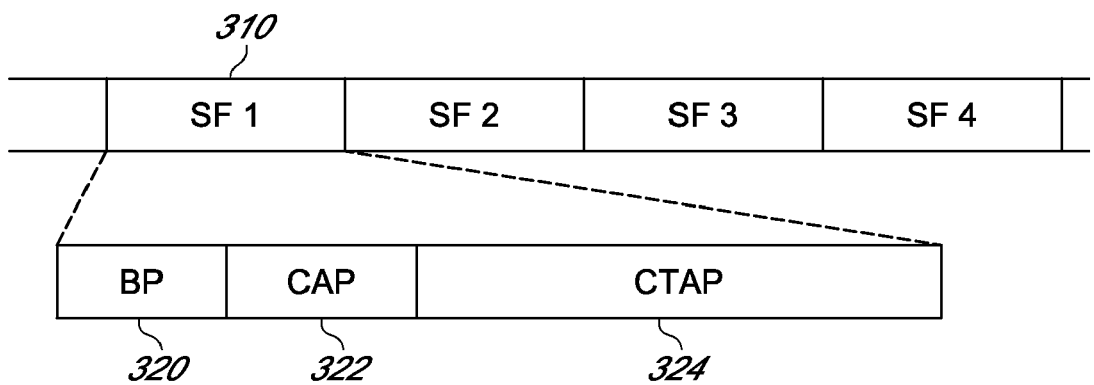
FIG. 3 is a timeline showing a plurality of superframes (SF) and their constituent parts, according to one embodiment.

As mentioned above, the coordinator 120 of FIG. 1 may partition a wireless channel into a number of time periods and schedule communication between specific devices during those time periods. FIG. 3 is a diagram of time partitioned into a plurality of superframes (SF) 310, according to one embodiment. Each of the superframes 310 may be further partitioned into a beacon period (BP) 320, a contention access period (CAP) 322, and a channel time allocation period (CTAP) 324. A skilled technologist will recognize that the superframe may further include other partitioned periods, such as guard time periods, depending on the design of the network.

During the beacon period 320, the coordinator, such as the coordinator 120 of FIG. 1, transmits beacons to wireless devices, such as the devices 130, 140, 150 of FIG. 1. A beacon is an electromagnetic waveform from which the devices can retrieve information about the network. The beacon may, for example, contain information about the coordinator or the superframe partitioning. A beacon may also contain data indicative of reservation schedule information for devices in the network, e.g., when a particular device should transmit data to the coordinator or vice versa. Beacons may be transmitted omni-directionally or in one or more particular directions. Depending on the embodiment, beacons may be transmitted using any of a number of modulation and coding schemes, and any number of physical layer transmission schemes, including orthogonal frequency division multiplexing (OFDM) and single-carrier transmission. Beacons may be broadcast, such that any device may receive and interpret the beacon, or they may be addressed to a particular device or group of devices. Beacons transmitted within the beacon period 320 are not necessarily the same size, and thus do not necessarily take the same amount of time to transmit. The beacon period 320 may be partitioned into sub-beacon periods, where a beacon is transmitted by the coordinator in one direction during each sub-beacon period.

The wireless channel may be a random access channel during the contention access period (CAP) 322. Any of a number of random access schemes may be used in the network, including, but not limited to, slotted Aloha, carrier sense multiple access (CSMA), carrier sense multiple access with collision avoidance (CSMA/CA), or preamble sense multiple access (PSMA). As is the case in many random access schemes, collisions may occur when a number of devices transmit data packets simultaneously.

During the contention access period (CAP) 322, the wireless devices announce themselves to the coordinator by transmitting messages, such as association request messages to the coordinator. In response to these messages, the coordinator may reserve time during the CTAP 324 of subsequent superframes for communication with the device and may transmit information indicative of the reservation to the device during the beacon period 320.

Many types of messages, including MAC commands, can be included in a packet and transmitted during the CAP 322 of a superframe (SF) 310. For example, devices may transmit data to one another bypassing the coordinator during the CAP 322. Also, other data packets besides association messages may be transmitted from the devices to the coordinator during the CAP 322.

As mentioned above, the channel time allocation period is the time partition reserved for communication between specific devices of the network. During reserved channel time, denoted channel time allocation (CTA), two devices, such as the coordinator and another device, may efficiently transmit large amounts of data, such as audio or video data. Other non-data functions, such as beamforming training or tracking procedures, may also be performed during the reserved time.

Association is the process by which a device joins a network. Associating with a network may involve, for example, providing the device with a unique device identifier. The association process may also include providing information about the services offered by the network and/or the device.

In general, association is the process by which two devices establish an awareness of the other and may further involve selecting and communicating certain parameters to make further communication more efficient and/or more reliable. For example, in one embodiment, the association process between a first device and a second device includes the exchange of information relating to preferred transmission directions of the other device, e.g. a transmission direction in which the reception at the receiving device is strong.

Figure 4:
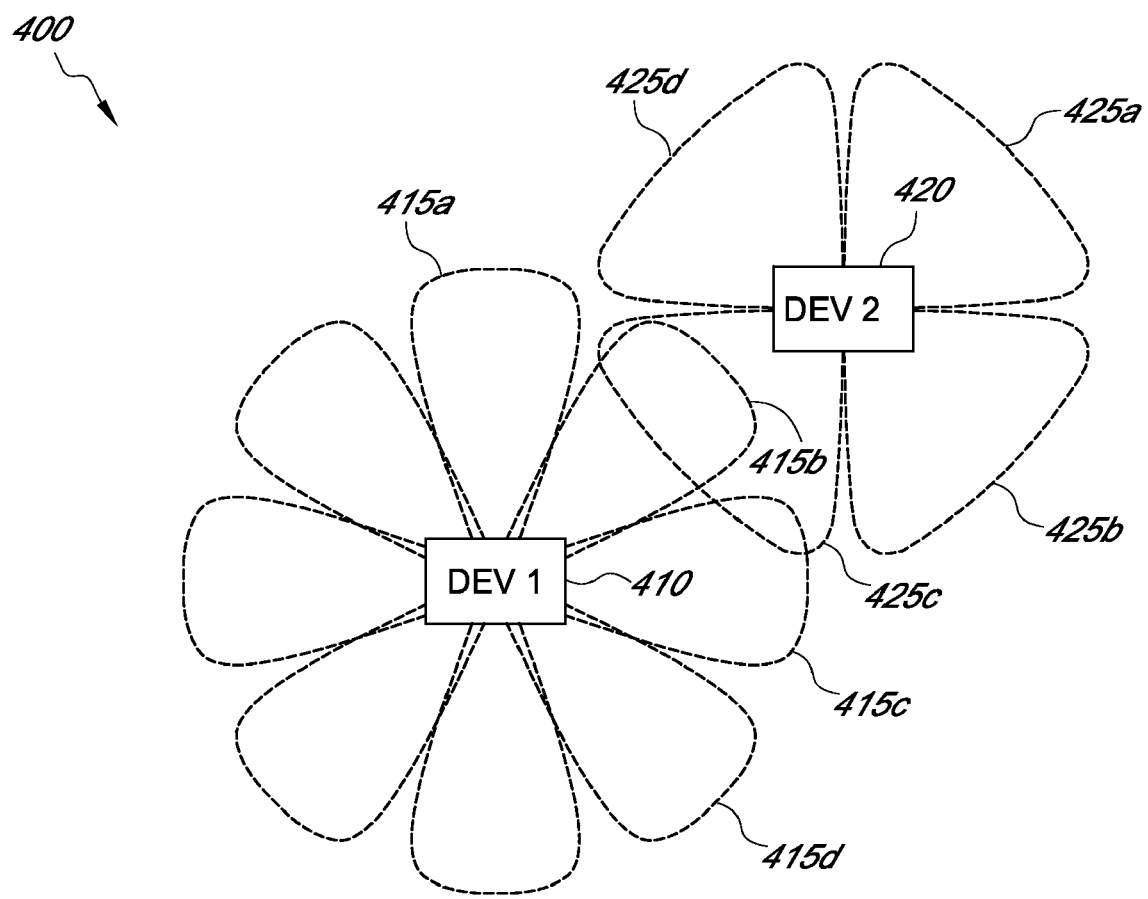
FIG. 4 is a diagram of an exemplary wireless network comprising a first device and a second device with symmetric antenna systems.

Association may be performed, for example, when a device first powers on, in order to establish itself as part of a wireless network. FIG. 4 is a diagram of an exemplary wireless network comprising a first device and a second device with symmetric antenna systems which will be used to explain an exemplary process of association. The exemplary network 400 includes a first device 410 with eight transmission/reception directions 415 and a second device 420 with four transmission/reception directions 425. The first device 410 includes a symmetric antenna system (SAS), meaning that the transmission and reception directions of the first device are the same. Similarly, the transmission directions and reception directions of the second device are the same.

SAS Association and Direction Selection

Figure 5:
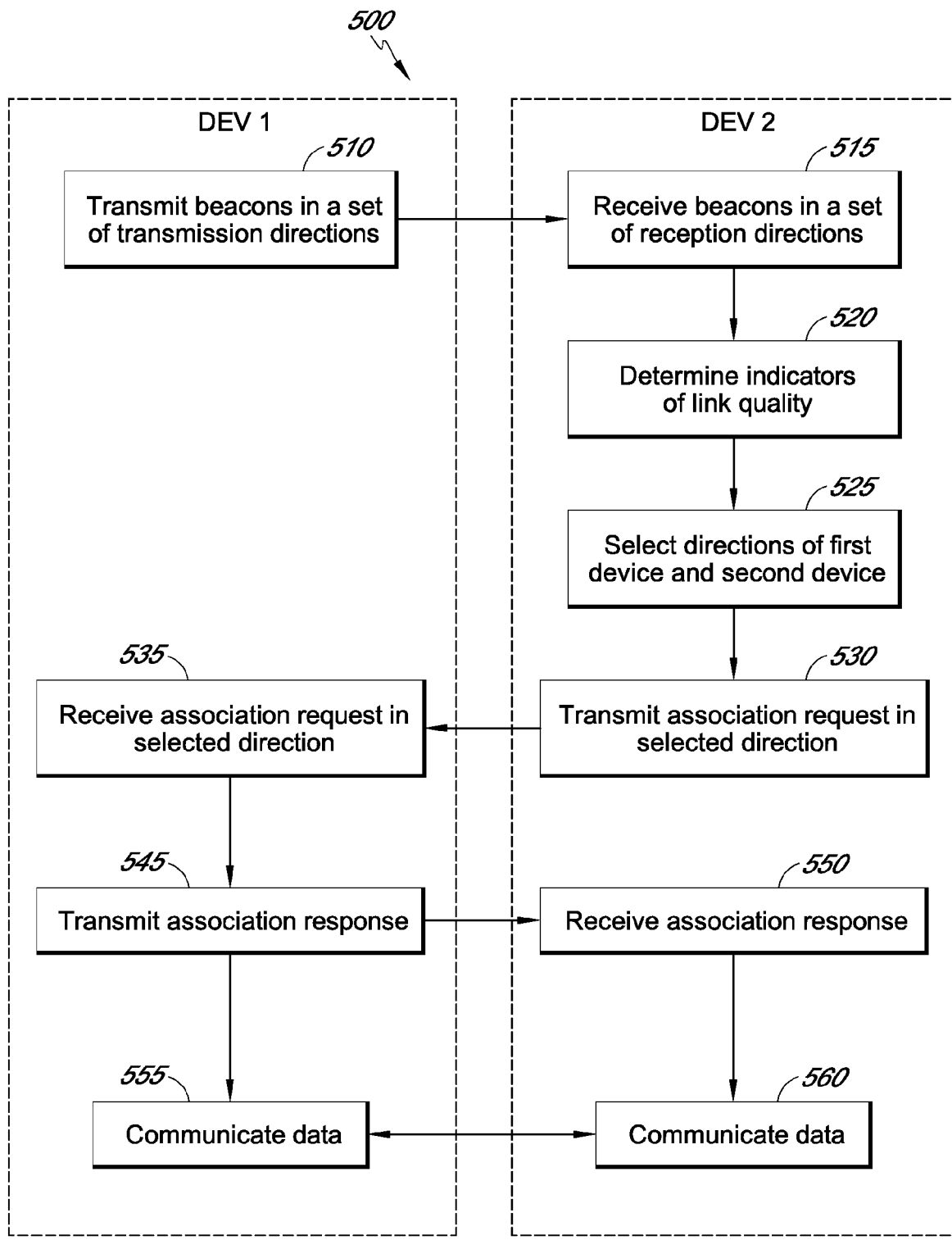
FIG. 5 is a flowchart illustrating a method of device association in the exemplary network of FIG. 4.

FIG. 5 is a flowchart illustrating a method of association and direction selection with reference to in the exemplary network of FIG. 4. The method 500 begins, in block 510, with the transmission of beacons by the first device 410. The beacons may be transmitted, for example, during the beacon period of a partitioned superframe including the aforementioned beacon period, as well as a contention access period and a channel time allocation period.

The wireless channel 600 is partitioned into a plurality of superframes, each superframe including a beacon period (BP), a contention access period (CAP), and a channel time allocation period (CTAP). During the beacon period 612 of the first superframe 610, the first device transmits a set of directional beacons ($Dir_x$) 614 in a first set of transmission directions, e.g., the directions labeled 415a and 415b in FIG. 4. During the beacon period 622 of the second superframe 620, the first device transmits a set of directional beacons ($Dir_x$) 624 in a second set of transmission directions, e.g., the direction labeled 415c and 415d in FIG. 4. This process can repeat in a round-robin fashion until beacons have been transmitted in all transmission directions of the first device 410.

In one embodiment, the set of transmission directions in each SF includes only one transmission direction. In this way, transmission of a beacon in all directions takes a number of superframes equal to the number of transmission directions of the device, e.g., for first device 410 there would be a need to use eight SFs to cover all directions. In another embodiment, the set of transmission directions in each SF includes all possible transmission directions of the device. In this way, only one SF would be needed to cover all directions. Other beacons may be transmitted during the beacon period 612 of any particular superframe, including tracking beacons and sector training beacons as will be explained below.

Figure 6A:
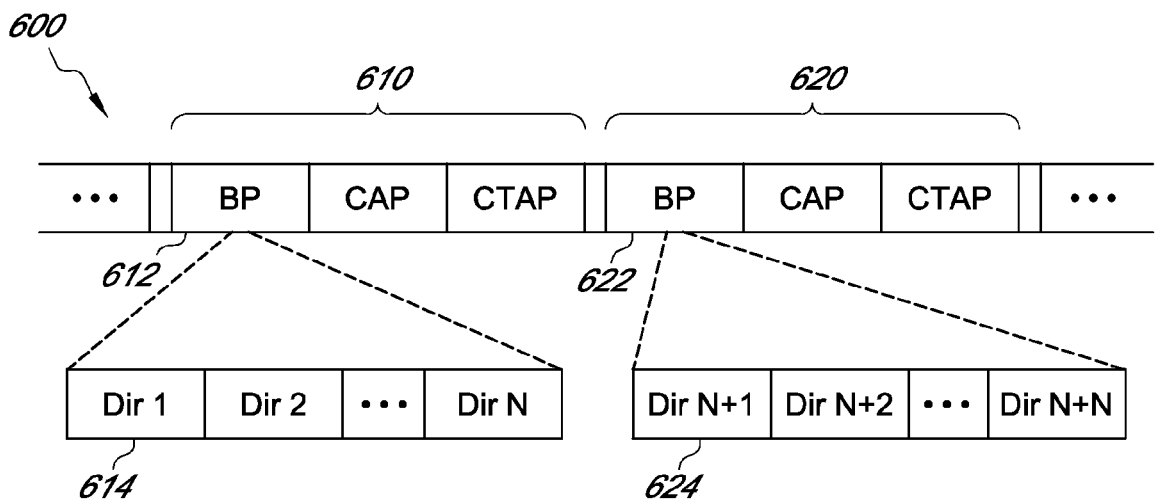
FIG. 6A is a timeline showing the constituent parts of a plurality of superframes in which a set of directional beacons (Dir) are transmitted in the beacon period (BP) of each superframe.

In block 515 of FIG. 5, the second device 420 receives beacons from the first device 410. In one embodiment, the second device "listens" for beacons in a first reception direction until beacons have been transmitted for each transmission direction of the first device. Using the transmission scheme of FIG. 6, this means the second device would set its reception direction to a first direction, e.g. the direction labeled 425a, for a number of superframes. Then, the second device would set its reception direction to a second direction, e.g. the direction labeled 425b, for a number of superframes. After a number of superframes, the second device would have received beacons for each transmission/reception direction combination. For example, if first device 410 were transmitting a directional beacon in all possible directions of the device each superframe, it would take second device 420 four superframes to have received beacons in each transmission/reception direction. If device 410 were transmitting a directional beacon in only one direction each superframe, it would take second device 420 thirty-two superframes to have received beacons in each transmission/reception direction.

Upon reception of beacons in block 515, the process 500 of FIG. 5 moves to block 520, where the second device 420 determines one or more indicators of link quality based on the received beacons. The indicators of link quality may include, for example, signal-to-noise ratio (SNR), signal-to-interference-plus-noise ratio (SINR), bit error rate (BER), packet error rate (PER), or receiver signal strength indication (RSSI). Methods to calculate such link quality measures are known and new methods may be derived in the future. The indicators of link quality may help to determine which transmission and reception directions to use for the most efficient and/or reliable communication. Next, in block 525, the second device 420 selects a transmission direction of the first device and a reception direction of the second device to use for communication between the two devices. This selection will generally be based on the calculated indicator(s) of link quality. For example, the selection may be the directions which potentially yield the highest SNR, or the lowest BER.

At this point of the procedure, efficient communication between the two devices using the selected directions cannot occur, as only the second device 420 knows the selected direction(s). Thus, in block 530, the second device 420 transmits an association request containing at least the selected transmission direction of the first device. The association request may also include an address of the first or second device, capabilities of the first and second device, or details concerning the nature of the association (e.g., how long the devices will remain associated in the absence of communication, etc.) As both devices employ symmetric antenna systems, the selection also implies a reception direction of the first device and a transmission direction of the second device. The association request may advantageously be transmitted in the implied transmission direction of the second device when the second device is configured to receive in the implied reception direction of the first device.

Figure 6B:
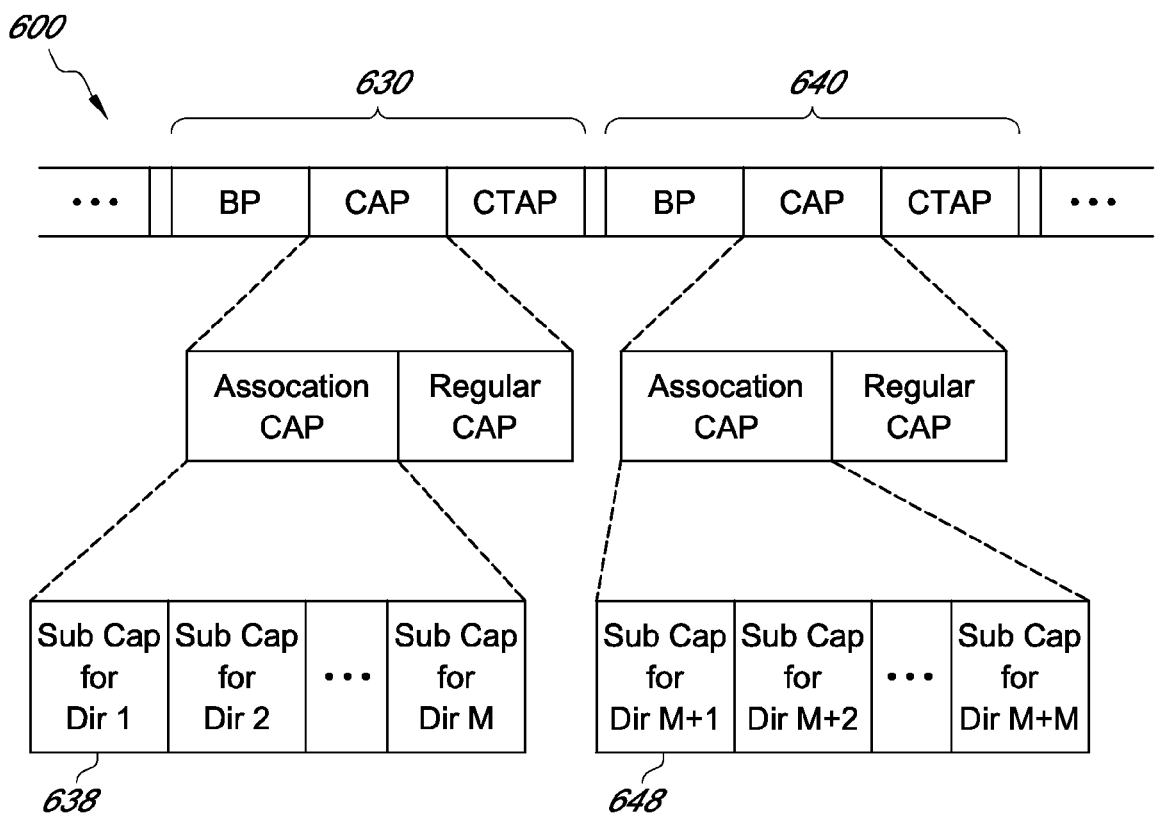
FIG. 6B is a timeline showing the constituent parts of a plurality of superframes in which the contention access period (CAP) is divided into an association CAP and a regular CAP and the association or regular CAP is further divided into multiple sub-CAPs.

The first device 410 is configured to receive data packets during the contention access period. In a manner similar to the partitioning of the beacon period with respect to direction, the contention access period may also be partitioned into a number of sub-CAPs, as described further in assignee's commonly owned patent application identified as U.S. patent application Ser. No. 12/189,534, entitled "System and method for multiple contention access periods," filed Aug. 11, 2008, and herein incorporated by reference in its entirety. FIG. 6B illustrates a partitioning of the contention access period. The wireless channel 600 is partitioned into a plurality of superframes, each superframe (SF) including a beacon period (BP), a contention access period (CAP), and a channel time allocation period (CTAP). The contention access period 634 of the first superframe 630 is split into two sub-contention access periods: i) an association CAP 634 and ii) a regular CAP 636. The first device 410 is configured to receive association requests during the association CAP 634 and is configured to receive other data packets during the regular CAP 636. The first device 410 may also transmit control or data packets during the association CAP 634 or the regular CAP 636. The sub-CAPs may be separated by guard time intervals (not shown).

The association CAP 634 is further partitioned into directional association sub-CAPs 638 in which the first device 410 is configured to receive an association request in a particular direction. The regular CAP 636 can be partitioned similarly or differently. During the association CAP 634 of the first superframe 630, the first device 410 is configured to receive association requests in a set of reception directions, e.g., the directions labeled 415a and 415b in FIG. 4. During the association CAP period 644 of the second superframe 640, the first device 410 is configured to receive association requests in a second set of reception directions, e.g., the direction labeled 415c and 415d in FIG. 4. This process can repeat in a round-robin fashion until all reception directions of the first device 410 have been covered. As the network 400 is composed of devices with symmetrical antennas, the reception directions and transmission directions of a device are substantially the same.

Moving to block 535 of FIG. 5, the first device 410 receives the association request. At this point in the procedure, both the first and second devices know the selected transmission and reception direction for both devices. Efficient and/or reliable communication can thus commence at an appropriately scheduled time. However, the second device 420 does not know that association has been successful. To remedy this, the first device 410 transmits, in block 545, an association response to the second device 420 containing at least this information. The association response will generally be transmitted in the selected transmission direction of the first device. In some embodiments, the association response may be transmitted during the beacon period. Alternatively, the association response may be transmitted during the CAP.

At block 550, the second device 420 receives the association response. At this point of the procedure, both devices know how (the selected transmission/reception directions) to efficiently and reliably communicate with each other. Thus, the first and second device proceed to blocks 555 and 560 respectively in which data is communicated. This may further involve the exchange of communication details, including details concerning protocol and details concerning when communication occurs (e.g., channel time allocation requests and channel time allocations).

AAS Association and Direction Selection

The process of association is made more complicated through the use of asymmetric antenna systems. In some devices, the transmitter antennas and receiver antennas are physically separate resulting in different transmission and reception directions. In some devices, the number of transmitter antennas and receiver antennas are different, again resulting in different transmission and reception directions. In still other devices, even in those devices in which the transmitter antennas and receiver antennas are physically the same, the transmitter and receiver gains or other configurations may be different, resulting in different directional selections according to different transmit or receive configurations.

Figure 7:
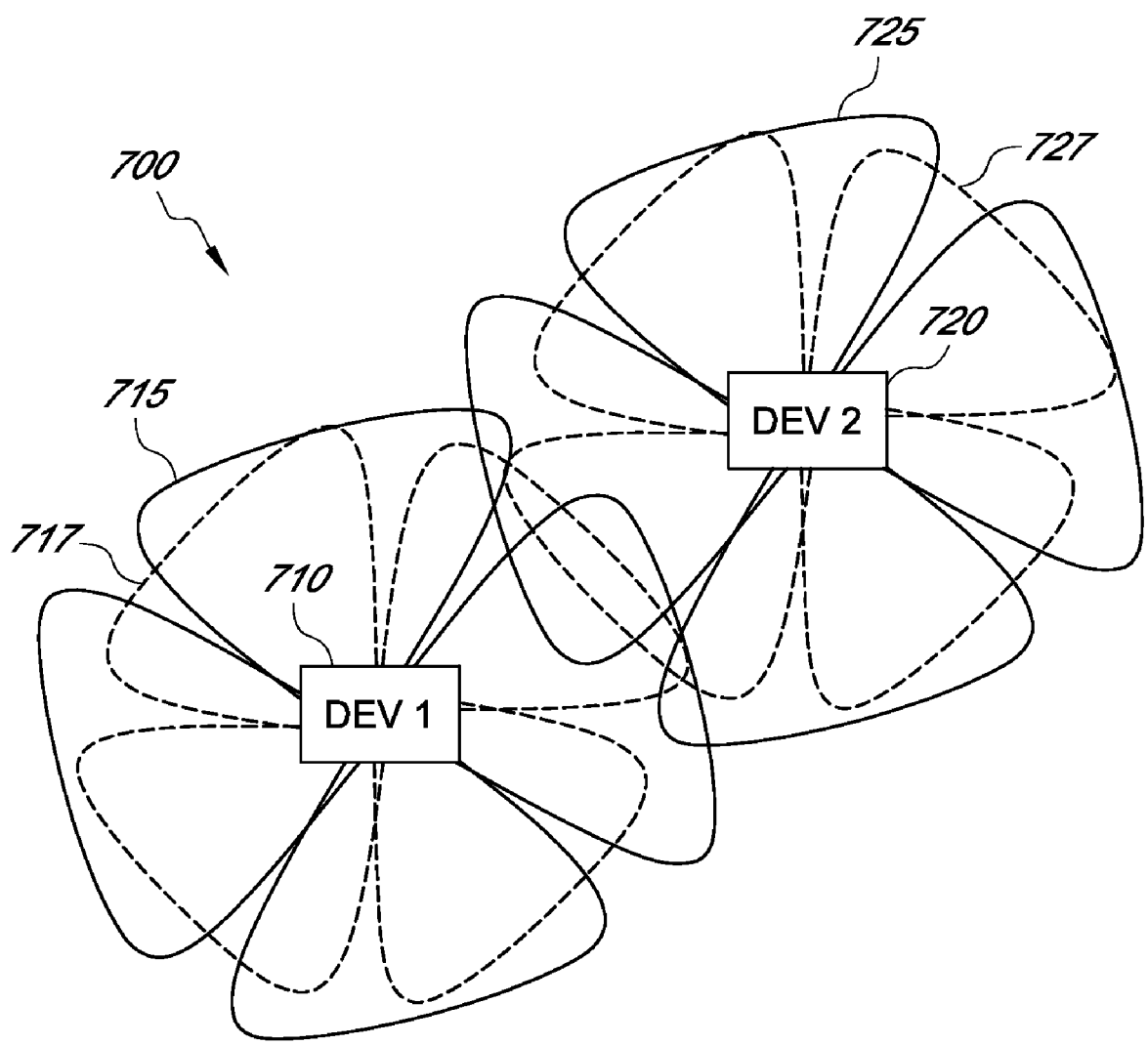
FIG. 7 is a diagram of an exemplary wireless network comprising a first device and a second device with asymmetric antenna systems.

FIG. 7 is a diagram of an exemplary wireless network comprising a first device and a second device with asymmetric antenna systems. The exemplary network 700 comprises a first device 710 with four transmission directions 715 and four reception directions 717. The network 700 further comprises a second device 720 with four transmission directions 725 and four reception directions 727. In other network embodiments, the number of transmission directions of the first or second device may differ from the number of reception directions of the device. In some embodiments, at least one of the transmission or reception directions of the first or second device comprises an omni-directional direction. For example, the reception direction of the first device may be omni-directional, even though the transmission directions may include a number of sectors.

The asymmetry of the antenna systems changes some of the assumptions made in the association procedure 500 described with respect to FIG. 5. In particular, selection of the transmission direction of the first device does not imply that the same direction is selected for the reception direction of the first device. Similarly, selection of the reception direction of the second device does not imply that the same direction is selected for the transmission direction of the second device.

Figure 8:
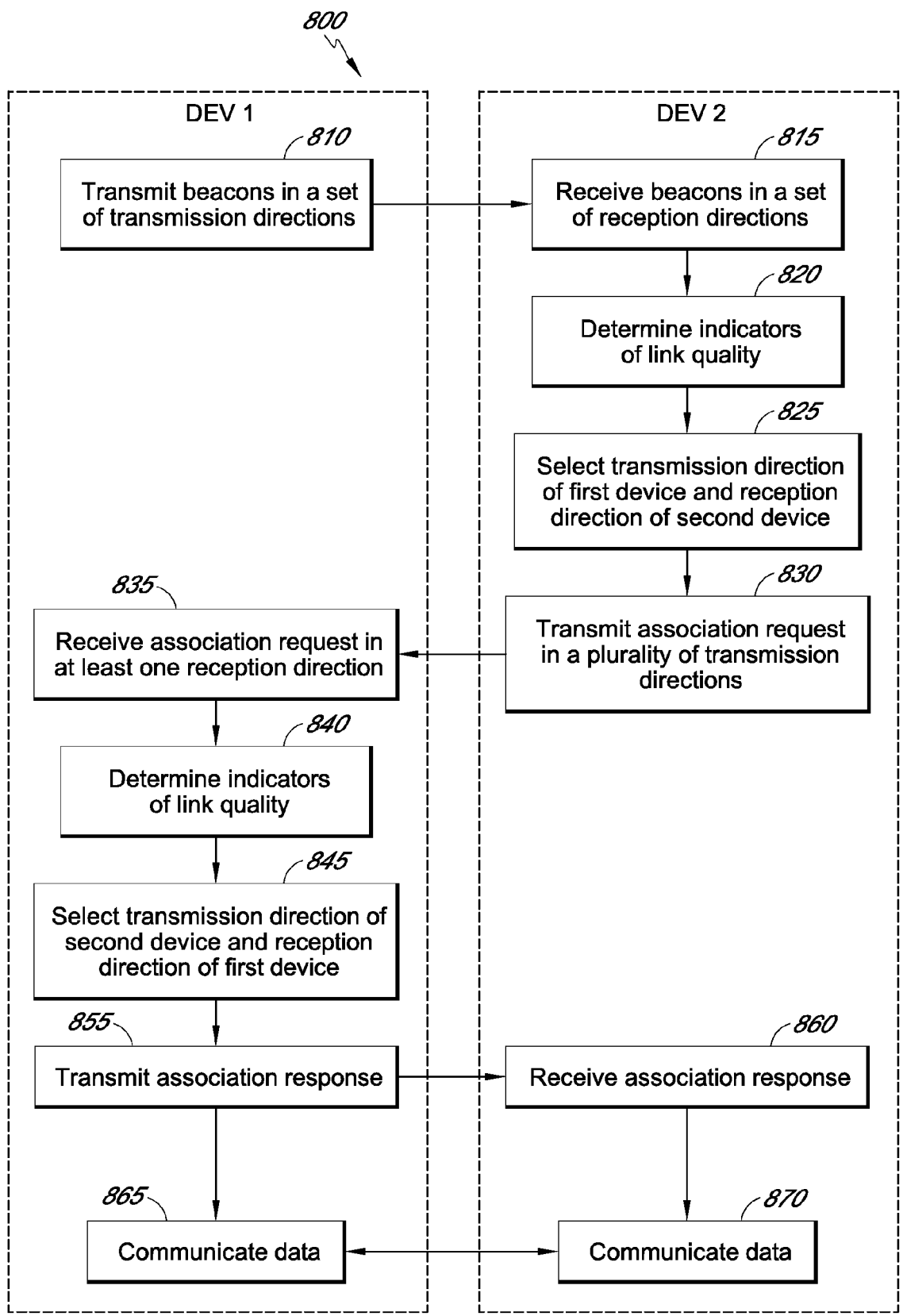
FIG. 8 is a flowchart illustrating a method of device association in the exemplary network of FIG. 7.

With respect to FIG. 8, the asymmetric association and direction selection procedure 800 begins, in block 810, with the transmission of beacons by the first device 710. The beacons may be transmitted, for example, during the beacon period of a partitioned superframe (SF) comprising a beacon period (BP), a contention access period (CAP), and a channel time allocation period (CTAP). As discussed above, the first device 710 transmits a set of beacons in a set of transmission directions during the beacon period of each superframe until a beacon has been transmitted in each transmission direction of the first device.

In block 815 of FIG. 8, the second device 720 receives beacons from the first device 710. In one embodiment, the second device 720 "listens" for beacons in a first reception direction until beacons have been transmitted for each transmission direction of the first device. Thus, the second device 720 is configured to receive beacons in a first reception direction at least until beacons have been transmitted for each transmission direction of the first device. Then the second device 720 changes its configuration so as to receive beacons in a second reception direction until beacons have been transmitted (by the first device 710) in each transmission direction of the first device. After a number of superframes, the second device receives beacons for each transmission/reception direction combination.

After receiving beacons in block 815, the second device moves to block 820 of FIG. 8 where it determines indicators of link quality based on the received beacons. As discussed previously for the symmetric antenna configuration, the indicators of link quality may include, for example, signal-to-noise ration (SNR), signal-to-interference-plus-noise ratio (SINR), bit error rate (BER), packet error rate (PER), or receiver signal strength indication (RSSI). The indicators of link quality may help to determine which transmission direction of the first device and reception direction of the second device to use for the most efficient and/or reliable communication. In block 825, the second device selects a transmission direction of the first device and a reception direction of the second device to use for communication between the two devices. This selection may be based on the indicators of link quality. For example, the selection may be the directions which potentially yield the highest SNR, or the lowest BER.

At this point of the procedure, efficient communication between the two devices using the selected directions cannot occur as only the second device knows the selected directions, and the selected direction only allow for one-way transmission (from the first device 710 to the second device 720). Further, the selected direction(s) cannot be easily communicated to the first device, as a working transmission direction of the second device and reception direction of the first device have not yet been established.

In block 830, the second device transmits association requests containing at least the selected transmission direction of the first device. The association request may also include an address of the first or second device, capabilities of the first and second device, or details concerning the nature of the association (e.g., how long the devices will remain associated in the absence of communication, etc.). Because the second device 710 does not know which transmission direction of the second device to transmit the association request or which sub-association CAP it should transmit it in, the association request may be sent in a manner similar to beacon transmission of the first device 710. For example, in one embodiment, the second device 720 transmits an association request in each transmission direction of the second device during each sub-association contention access period 638. This may be repeated until an association request is transmitted for each transmission/reception pair. In other embodiments, discussed in more detail below, transmission of association requests stops as soon as one is received by the first device 710. In another embodiment, the second device transmits an association request in a first transmission direction of the second device during each sub-association contention access period 638 of a first superframe 630 (see FIG. 6B). In the next superframe 640, the second device 720 transmits an association request in a second transmission direction of the second device during each sub-association contention access period 648 of the superframe. In subsequent superframes, the second device 720 transmits an association request in the subsequent transmission direction of the second device during each sub-contention access period of the superframe until an association request is received by the first device 710 or an association request has been transmitted for each transmission/reception pair.

In block 835 of FIG. 8, the first device 710 receives at least one association request. In some embodiments, the first device has received a number of association requests, each associated with a different pair of directions. At this point in the procedure, both the first and second device know the selected transmission direction of the first device, and the second device further knows the reception direction of the second device. Efficient and/or reliable one-way communication (from the first device to the second device) can thus commence at an appropriately scheduled time. However, the second device does not know this scheduled time, nor is two-way communication made as efficient and/or reliable as possible.

In the illustrated embodiment of FIG. 8, in block 840, the first device 710 determines indicators of link quality based on the received association request(s). As discussed previously, the indicators of link quality may include, for example, signal-to-noise ration (SNR), signal-to-interference-plus-noise ratio (SINR), bit error rate (BER), packet error rate (PER), or receiver signal strength indication (RSSI). The indicators of link quality may help to determine which transmission direction of the second device and reception direction of the first device to use for the most efficient and/or reliable communication. In block 845, the first device 710 selects a transmission direction of the second device and a reception direction of the first device to use for communication between the two devices. This selection may be based on the indicators of link quality. For example, the selection may be the directions which potentially yield the highest SNR, or the lowest BER.

At this point, the second device 720 does not know that association has been successful (or the transmission direction of the second device). To remedy this, the first device 710 transmits, in block 855, an association response to the second device 720 containing at least this information. The association response may be transmitted in the selected transmission direction of the first device. Alternatively, the association response may be transmitted as an omni-directional transmission. The association response may be transmitted during the beacon period. Alternatively, the association response may be transmitted during the CAP.

At block 860, the second device 720 receives the association response. At this point of the procedure, both devices know how (the selected transmission/reception directions) to efficiently and reliably communicate with each other. Thus, the first and second devices proceed to blocks 865 and 870 respectively in which data is communicated. This may further involve the exchange of communication details, including details concerning protocol and details concerning when communication occurs (e.g., channel time allocation requests and channel time allocations).

Since the wireless channel is a random access channel during the contention access period, a collision may occur during the transmission of the association request (e.g., in block 830) in the "best" transmission direction of the second device while the first device is configured to receive association requests in the "best" reception direction of the first device. In order to optimize this procedure, a search over all possible transmission directions of the second device and reception directions of the first device may be performed after association, for example, during a portion of the CTAP, when collisions would not occur.

Figure 9:
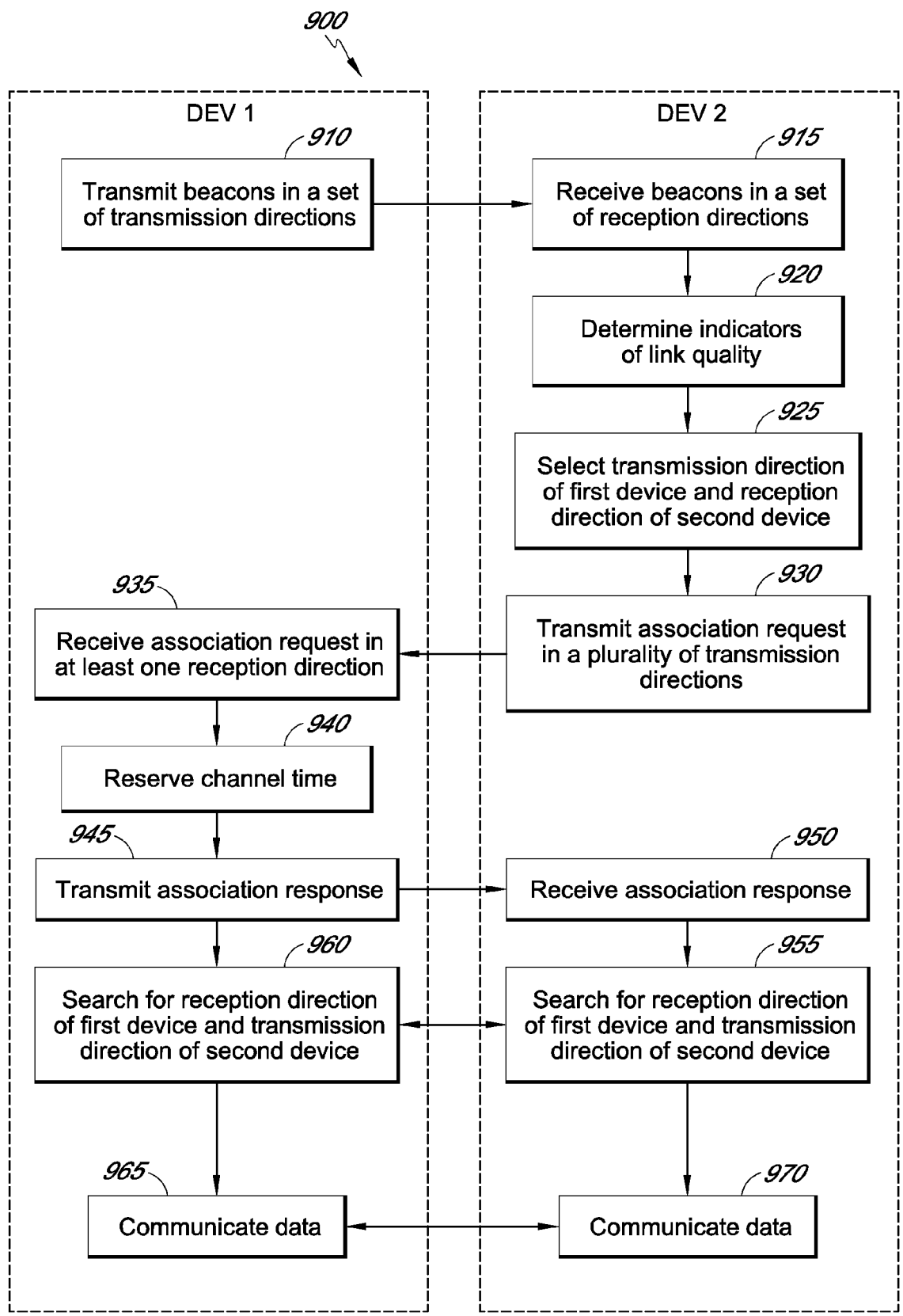
FIG. 9 is a flowchart illustrating another method of device association in the exemplary network of FIG. 7.

FIG. 9 is a flowchart illustrating a method of association and direction selection in the exemplary network of FIG. 7 for which this search is performed. The procedure 900 begins, in block 910, with the transmission of beacons by the first device 710. The beacons may be transmitted, for example, during the beacon period of a partitioned superframe comprising a beacon period, a contention access period, and a channel time allocation period. As discussed above, the first device 710 transmits a set of beacons in a set of transmission directions during the beacon period of each superframe until a beacon has been transmitted in each transmission direction of the first device.

In block 915 of FIG. 9, the second device 720 receives beacons from the first device 710. In one embodiment, the second device 720 "listens" for beacons in a first reception direction until beacons have been transmitted for each transmission direction of the first device. Thus, the second device 720 is configured to receive beacons in a first reception direction at least until beacons have been transmitted for each transmission direction of the first device, then the second device 720 changes its configuration so as to receive beacons in a second reception direction until beacons have been transmitted (by the first device 710) in each transmission direction of the first device. In response to receiving the beacons, the second device continues to block 920 of FIG. 9, where the second device 720 determines indicators of link quality based on the received beacons. As previously discussed, the indicators of link quality may include, for example, signal-to-noise ration (SNR), signal-to-interference-plus-noise ratio (SINR), bit error rate (BER), packet error rate (PER), or receiver signal strength indication (RSSI). The indicators of link quality may help to determine which transmission direction of the first device and reception direction of the second device to use for the most efficient and/or reliable communication. In block 925, the second device 720 selects a transmission direction of the first device and a reception direction of the second device to use for communication between the two devices. This selection may be based on the indicators of link quality. For example, the selection may be the directions which potentially yield the highest SNR, or the lowest BER.

At this point of the procedure, efficient communication between the two devices using the selected directions cannot occur as only the second device 720 knows the selected directions, and the selected direction only allow for one-way transmission (from the first device 710 to the second device 720). Further, the selected direction(s) cannot be easily communicated to the first device 710, as a working transmission direction of the second device and reception direction of the first device have not yet been established.

In block 930, the second device 720 transmits association requests containing at least the selected transmission direction of the first device. The association request may also include an address of the first or second device, capabilities of the first and second device, or details concerning the nature of the association (e.g., how long the devices will remain associated in the absence of communication, etc.). Because the second device 710 does not know which transmission direction of the second device to transmit the association request or which sub-association CAP it should transmit it in, the association request may be sent in a manner similar to beacon transmission of the first device 710. For example, in one embodiment, the second device 720 transmits an association request in each transmission direction of the second device during each sub-association contention access period 638. This may be repeated until an association request is transmitted for each transmission/reception pair. However, as a search will be performed over all possible transmission/reception pairs during a portion of the CTAP after association in this embodiment, such repetition is unnecessary. Thus, in some embodiments, transmission of association requests stops as soon as one is received by the first device 710 (and/or the corresponding association response is received by the second device 720).

In another embodiment, the second device 720 transmits an association request in a first transmission direction of the second device during each sub-association contention access period 638 of a first superframe 630. In the next superframe 640, the second device 720 transmits an association request in a second transmission direction of the second device during each sub-association contention access period 648 of the superframe. In subsequent superframes, the second device 720 transmits an association request in the subsequent transmission direction of the second device during each sub-contention access period of the superframe until an association request is received by the first device 710 (and/or the corresponding association response is received by the second device 720) or an association request has been transmitted for each transmission/reception pair. In block 935 of FIG. 9, the first device 710 receives at least one association request. At this point in the procedure, both the first and second devices know the selected transmission direction of the first device, and the second device further knows the reception direction of the second device. Efficient and/or reliable one-way communication (from the first device 710 to the second device 720) can thus commence at an appropriately scheduled time. However, the second device 720 does not know this scheduled time, nor is two-way communication made as efficient and/or reliable as possible.

In block 940, the first device 710 reserves or schedules time during the channel time allocation period (CTAP) to determine a transmission direction for the second device and a corresponding reception direction of the first device. However, the second device 720 does not know this scheduled time. To remedy this, the first device 710 transmits, in block 945, an association response to the second device 720 containing this information. The association response may be transmitted in the selected transmission direction of the first device. Alternatively, the association response may be transmitted as an omni-directional transmission. The association response may be transmitted during the beacon period. Alternatively, the association response may be transmitted during the CAP.

At block 950, the second device 720 receives the association response. At this point of the procedure, both devices know how (the selected transmission direction of the first device and selected reception direction of the second device) to efficiently and reliably perform one-way (from the first device 710 to the second device 720) communication. They also know when (the reserved channel time) to perform a search to select a transmission direction of the second device and corresponding reception direction of the first device.

The first and second devices proceed to blocks 955 and 960 respectively in which a search is performed. The search may, for example, be an exhaustive search or multi-stage antenna training algorithm as described in assignee's commonly owned patent application identified as U.S. patent application Ser. No. 12/264,100, entitled "System and method for multi-stage antenna training of beamforming vectors," filed Nov. 3, 2008, and herein incorporated by reference in its entirety. A transmission direction of the second device and a reception direction of the first device is selected and communicated between the devices can commence. The selection may be one which potentially yields the best results, e.g. highest signal-to-noise ratio or lowest bit error rate. The first and second devices proceed to blocks 965 and 970 respectively in which data is communicated during a scheduled time.

Direction Tracking

If a first and second device, such as those shown in FIG. 7, move with respect to each other from their original position after association has been performed, the second device 720 may no longer receive beacons correctly using the selected transmission direction of the first device and the selected reception direction of the second device. Even if beacons are still received using the selected directions, a higher signal quality may be achieved using a different direction pair. Such a scenario is described with respect to a system employing symmetrical antenna systems in assignee's commonly owned patent application identified as U.S. patent application Ser. No. 12/189,714, entitled "System and method for maintaining reliable beacon transmission and reception in a wireless communication network, filed Aug. 11, 2008, and herein incorporated by reference in its entirety.

There are several methods to maintain robust beacon communication in this embodiment. In one such method, after association has been performed, the second device 720 maintains its selected reception direction and measures the signal quality of beacons transmitted in the selected transmission direction of the first device as well as the signal quality of other beacons transmitted in other transmission directions of the first device. In addition to measuring the signal quality of device discovery beacons transmitted as described above with respect to FIG. 6A, the second device 720 may measure the signal quality of beacons addressed or specifically transmitted to other devices in other transmission directions of the first device. By comparing the signal quality of a beacon transmitted in the selected transmission direction of the first device to the signal quality of beacons transmitted in directions other than the selected direction, the second device 720 may determine that communication using a different transmission direction of the first device would yield a higher signal quality. If it is so determined, the second device 720 may trigger a beacon direction switching procedure by transmitting a beacon direction switching request. Such a request may be transmitted during either the CAP using a random access procedure, such as is done for the original association request, or transmitted during the CTAP scheduled for communication between the first 710 and the second device 720. In response, the coordinator 710 may reply with a beacon direction switching response either during the beacon period, the CAP, or the CTAP.

In another method of maintaining robust beacon communication, the second device 720 changes its device reception direction from the selected reception direction of the second device during the beacon period (and switches back during the CTAP) in order to measure the signal quality of other beacons transmitted from the first device 710. In this way, the second device 720 may, over time, attempt to measure the signal quality of all direction pairs. Power consumption and time may be reduced by measuring the signal quality of direction pairs that had previously been identified during the association procedure as being of a signal quality higher than a threshold or by re-measuring the signal quality of the direction pairs with the highest (e.g., the top three, top five, or top ten) signal quality during the association stage. If it is determined that a direction pair would yield a higher signal quality, the second device 720 may trigger a beacon direction switching procedure by transmitting a beacon direction switching request.

Different criteria may be used by the second device 720 to determine if a beacon direction switch request should be sent. For example, a switch request may be sent upon first indication that a different transmission direction of the first device or direction pair would yield higher signal quality. In other embodiments, a switch request is only sent when the second device 720 continually detects that a different transmission direction of the first device or direction pair provides a higher signal quality than the selected direction(s). This may be indicated when, over a certain number, e.g., three, of superframes, the measurement of signal quality for a particular direction(s) during the superframe is higher than the measurement of signal quality for the selected direction(s) performed during the superframe.

In some cases, a device may not be able to measure the signal quality for all possible direction pairs comprising a transmission direction of the first device and a reception direction of the second device. For example, in an exemplary network, the first device has transmission directions denoted $T_0$, $T_1$, $T_2$, and $T_3$, and the second device has reception directions $R_0$, $R_1$, $R_2$, and $R_3$. In a first case, an association procedure may have indicated that the direction pair yielding the highest signal-to-noise ratio is $T_0$-$R_0$ and the direction pair yielding the second highest signal-to-noise ratio is $T_1$-$R_1$. In this case, assuming the first device transmits, during each superframe, a beacon in each direction, the second device can measure both direction pairs during each superframe by setting its reception direction to $R_0$ when the first device transmits in direction $T_0$, and by setting its reception direction to $R_1$ when the first device transmits in direction $T_1$. However, in a second case, the association procedure may indicate that the direction pair yielding the highest signal-to-noise ratio is $T_0$-$R_0$ and the direction pair yielding the second highest signal-to-noise ratio is $T_0$-$R_1$. In this case, the second device could not measure both direction pairs during each superframe, as the first device only transmits once in direction $T_0$, and the second device could not simultaneously be set in directions $R_0$ and $R_1$.

In the second case, a number of mechanisms can be employed to overcome this issue. For example, in some instances, the first device can transmit a beacon in the $T_0$ direction as part of an association procedure, and can transmit a second beacon in the $T_0$ direction specifically addressed to the second device. The second device thus measures the signal quality of the first beacon while set in the $R_1$ direction, and measure the signal quality of the second beacon while set in the $R_0$ direction. In one embodiment, the first device is configured to receive information concerning the list of candidate direction pairs and to transmit as many beacons as necessary, during the beacon period of each superframe, in order to ensure each, or at least an additional, direction pair can be tracked. In another embodiment, a portion of the CTAP is scheduled for the transmission of extra beacons in order that each, or at least an additional, direction pair can be tracked.

Figure 10:
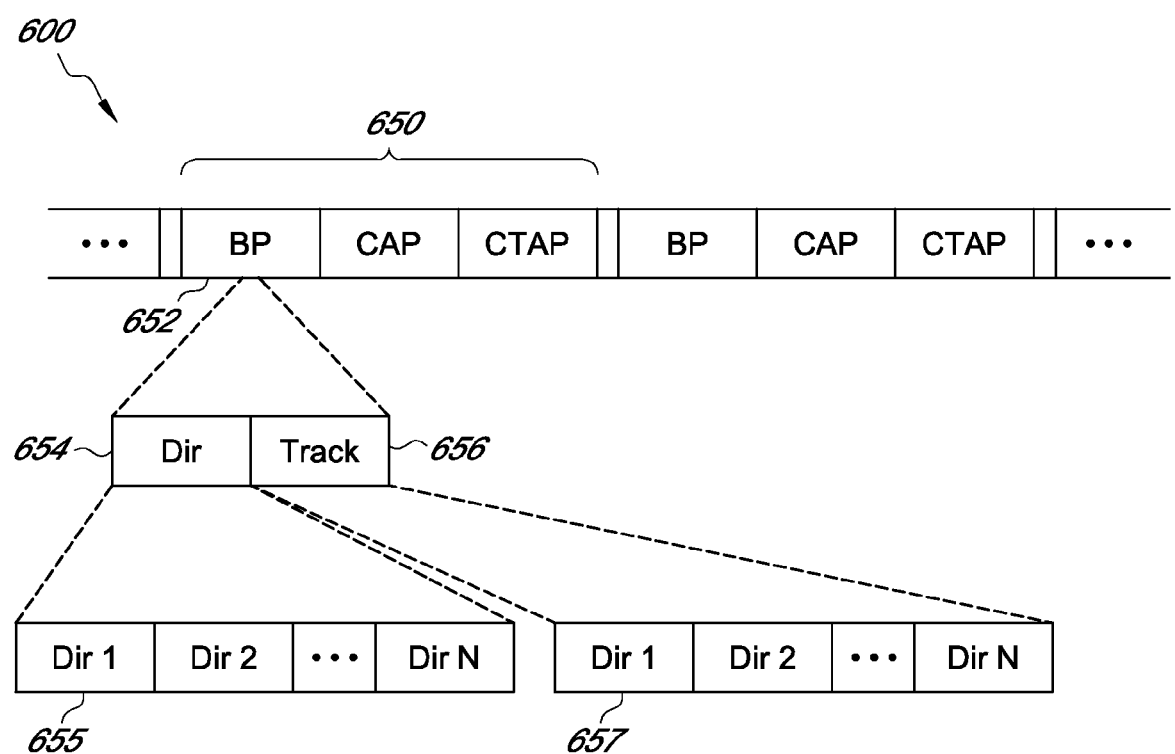
FIG. 10 is a timeline showing the constituent parts of a plurality of superframes in which a set of directional beacons (Dir) and tracking signals are transmitted in the beacon period (BP) of each superframe.

In another embodiment, illustrated in FIG. 10, the beacon period 652 of a superframe 650 includes i) a device discovery portion 654 having a number of directional device discovery beacons 655 and ii) a direction tracking portion 656 having a number of directional tracking beacons 657. By transmitting information twice in the same transmission direction of the first device, once during the device discover portion 654 and again during the direction tracking portion 656, the signal quality of two direction pairs, including the transmission direction of the first device, can be measured.

In general, it is unnecessary for the directional tracking beacons to include all of the information of the device discovery beacons, as the two beacon types serve different purposes. For example, the directional tracking beacons may include only a PHY preamble, whereas the device discovery beacons include a PHY preamble, a PHY header, a MAC header, and a MAC payload.

The above approaches do not require a significant amount of additional channel time spent making signal quality measurements. However, the amount of time to measure the signal quality from all transmission directions of the first device or all direction pairs may be relatively long. To speed up the beacon direction switching procedure, a channel time block may be reserved during the CTAP to perform signal quality measurement for different direction pairs comprising a transmission direction of the first device and a reception direction of the second device. Similarly, a channel time block may be reserved during the CTAP, after association, to perform signal quality measurement for the back-channel comprising it least one of a transmission direction of the second device and a reception direction of the first device.

For example, if a device measures the signal quality using the selected directions and finds that the signal quality is below a threshold, it may request that the first device reserve channel time for signal quality measurement. In response, the first device may reserve channel time (e.g., during the CTAP or a dedicated superframe period) for a supplemental direction search similar to that described with respect to blocks 955 and 960 of FIG. 9.

In is understood that any, some, or all of the devices of the network may benefit from the transmission of the measurement signals from the first or second device. That a channel measurement period has been reserved can be communicated to each of the devices of the network during the beacon period. For example, the first device may indicate that channel measurement will occur at a particular period of the superframe and devices other than the second device may make measurements based on signals transmitted from the first device.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of selecting directions for a first device and a second device in a wireless communication network, the method comprising:
   receiving, in a set of reception directions of the second device, one or more beacons, each beacon associated with a transmission direction of the first device;
   determining, based on the received beacons, indications of link quality;
   selecting, based on the indications of link quality, a particular transmission direction of the first device;
   selecting, based on the indications of link quality, a particular reception direction of the second device from the set of reception directions of the second device; and
   transmitting, in a plurality of transmission directions of the second device, data indicative of the selected transmission direction of the first device, during a plurality of sub-association contention access periods.

2. The method of claim 1, wherein the transmission directions of the second device are different from the reception directions of the second device.

3. The method of claim 1, wherein the transmission directions of the first device or the reception directions of the second device comprise an omni-directional direction.

4. The method of claim 1, wherein the indicators of link quality comprise at least one of a signal-to-noise ratio (SNR), signal-to-interference-plus-noise ratio (SINR), bit error rate (BER), packet error rate (PER), or receiver signal strength indication (RSSI).

5. The method of claim 1, wherein the data is indicative of the transmission direction of the second device in which the data is transmitted.

6. The method of claim 5, further comprising receiving data indicative of a particular transmission direction of the second device.

7. The method of claim 6, wherein transmitting, in a plurality of transmission directions of the second device, is stopped by the reception of data indicative of a particular transmission direction of the second device.

8. The method of claim 1, wherein the data further comprises an address of the first or second device.

9. The method of claim 1, wherein the data further comprises capabilities of the first or second device.

10. The method of claim 9, wherein the capabilities comprise at least one of a rating, a maximum transmission power, a maximum number of channel time request blocks a device can handle, a maximum number of associated devices, a preferred fragment size, or a supported data rate.

11. The method of claim 1, wherein the data is an association request.

12. The method of claim 1, further comprising:
   transmitting, in each of the transmission directions of the second device, a training signal; and
   receiving data indicative of a selected transmission direction of the second device.

13. The method of claim 12, wherein the data indicative of the selected transmission direction of the second device is received in the selected reception direction of the second device.

14. The method of claim 1, wherein receiving, in a set of reception directions of the second device, comprises:
   receiving, in a first reception direction, a first beacon associated with a particular transmission direction; and
   receiving, in a second reception direction, a second beacon associated with the particular transmission direction.

15. The method of claim 14, further comprising transmitting information indicative of the selection.

16. The method of claim 14, further comprising changing a data reception direction from the first reception direction to the second reception direction.

17. The method of claim 14, wherein the second beacon comprises a directional beacon and the first beacon comprises a discovery beacon, wherein the second beacon contains less data information than the first beacon.

18. The method of claim 14, wherein the indication of link quality comprises at least one of a signal-to-noise ratio, a signal-to-interference-plus-noise ratio, a bit error rate, a packet error rate, or a receiver signal strength indication.

19. The method of claim 1, wherein receiving, in a set of reception directions of the second device, comprises
   receiving a beacon indicative of a partitioning of a contention access period into an association contention access period and a regular contention access period, and wherein transmitting, in a plurality of transmission directions of the second device, comprises transmitting an association request during the association contention access period.

20. The method of claim 19, wherein the data packet is indicative of a partitioning of at least one of the association contention access period or the regular contention access period into a plurality of sub-periods associated with different directions.

21. A system for selecting directions for a first device and a second device in a wireless communication network, the system comprising:
   a receiver configured for receiving, in a set of reception directions of the second device, one or more beacons, each beacon associated with a transmission direction of the first device;
   a selector configured for selecting a particular transmission direction of the first device and a particular reception direction of the second device based on measures of link quality associated with the beacons; and
   a transmitter configured for transmitting, in a plurality of transmission directions of the second device, data indicative of the selected transmission direction of the first device, during a plurality of sub-association contention access periods.

22. The system of claim 21, wherein the receiver comprises one or more receiving antennas and the transmitter comprises one or more transmitting antennas which are physically separate from the receiving antennas.

23. The system of claim 21, wherein the transmitter or the receiver comprises a sector antenna.

24. The system of claim 21, wherein the selector comprises a determining module configured to determine measures of link quality based on the received beacons.

25. A method of selecting directions for a first device and a second device in a wireless communication network, the method comprising:
   transmitting one or more beacons in a set of transmission directions of the first device;
   receiving, in a reception direction of the first device, data indicative of a selected transmission direction of the first device and a transmission direction of the second device;
   determining whether data indicative of a selected transmission direction of the first device and transmission direction of the second device was received in a plurality of reception directions of the first device; and transmitting, in the selected transmission direction of the first device, data indicative of the transmission direction of the second device.

26. The method of claim 25, wherein the transmission directions of the first device are different from the reception direction of the first device.

27. The method of claim 25, wherein the transmission directions of the first device, reception direction of the first device, a reception direction of the second device, or the transmission direction of the second device comprise(s) an omni-directional direction.

28. The method of claim 25, further comprising:
receiving, in each of the reception directions of the first device, a training signal;
determining, based on the training signals, indications of link quality;
selecting, based on the indications of link quality, a particular transmission direction of the second device;
selecting, based on the indications of link quality, a particular reception direction of the first device; and
transmitting, in the selected transmission direction of the first device, data indicative of the selected transmission direction of the second device.

29. The method of claim 25, wherein transmitting one or more beacons in a set of transmission directions of the first device comprises:
transmitting, during a first time interval, one or more first beacons in a set of transmission directions; and
transmitting, during a second time interval, one or more second beacons in the set of transmission directions.

30. The method of claim 29, wherein the second beacons comprising directional beacons and the first beacons comprising discovery beacons, wherein the second beacons contain less data information than the first beacons.

31. The method of claim 29, wherein the first beacons comprise a preamble and a payload, and wherein second beacons consist of a preamble.

32. The method of claim 29, wherein a beacon is a data packet used to set timing allocations and to communicate management information about the wireless network.

33. The method of claim 29, wherein the first time interval and second time interval are within a beacon period of a single superframe.

34. The method of claim 25, wherein transmitting one or more beacons comprises
transmitting a beacon indicative of a partitioning of a contention access period into an association contention access period and a regular contention access period, and wherein receiving, in a reception direction of the first device, comprises receiving an association request during the association contention access period.

35. The method of claim 34, wherein the data packet is indicative of a partitioning of at least one of the association contention access period or the regular contention access period into a plurality of sub-periods associated with different directions.

36. A system for selecting directions for a first device and a second device in a wireless communication network, the system comprising:
a transmitter configured for transmitting one or more beacons in a set of transmission directions of the first device;
a selector configured for selecting a particular transmission direction of the first device and a particular reception direction of the second device based on measures of link quality associated with the beacons; and
a receiver configured for receiving, in a reception direction of the first device, data indicative of a selected transmission direction of the first device and a transmission direction of the second device;
wherein the transmitter is further configured for transmitting, in the selected transmission direction of the first device, data indicative of the transmission direction of the second device, during a plurality of sub-association contention access periods.

37. The system of claim 36, wherein the transmitter comprises one or more transmitter antennas and the receiver comprises one or more receiver antennas which are physically separate from the transmitting antennas.

38. The system of claim 36, wherein the transmitter or the receiver comprises a sector antenna.

39. A receiver for selecting directions for a first device and a second device in a wireless communication network, the receiver comprising:
a receiving module configured for receiving, in a set of reception directions of the second device, one or more beacons, each beacon associated with a transmission direction of the first device; and
a selector configured for selecting a particular transmission direction of the first device and a particular reception direction of the second device based on measures of link quality associated with the beacons,
wherein the receiving module is further configured for receiving data indicative of the selected transmission direction of the first device, wherein the data is transmitted, in a plurality of transmission directions of the second device, during a plurality of sub-association contention access periods.

40. A transmitter for selecting directions for a first device and a second device in a wireless communication network, the transmitter comprising:
a selector module configured for selecting a particular transmission direction of the first device and a particular reception direction of the second device based on measures of link quality associated with the beacons; and
a transmitting module configured for transmitting one or more beacons in a set of transmission directions of the first device, wherein the transmitting module is further configured for transmitting, in a selected transmission direction of the first device, data indicative of a transmission direction of the second device, during a plurality of sub-association contention access periods.

41. A coordinator for selecting directions for a first device and a second device in a wireless communication network, the coordinator comprising:
a selector module configured for selecting a particular transmission direction of the first device and a particular reception direction of the second device based on measures of link quality associated with the beacons; and
a coordinating module configured for coordinating transfer of one or more beacons in a set of transmission directions of the first device, wherein the coordinating module is further configured for coordinating transmission, in a selected transmission direction of the first device, data indicative of a transmission direction of the second device, during a plurality of sub-association contention access periods.

42. A coordinator for selecting directions for a first device and a second device in a wireless communication network, the coordinator comprising:
a coordinating module configured for coordinating receiving, in a set of reception directions of the second device, one or more beacons, each beacon associated with a transmission direction of the first device, coordinating selection of a particular transmission direction of the first device and a particular reception direction of the second device based on measures of link quality associated with the beacons, and for coordinating receiving of data indicative of the selected transmission direction of the first device, wherein the data is transmitted, in a plurality of transmission directions of the second device, during a plurality of sub-association contention access periods.

* * * * *